(12) United States Patent
Murphy et al.

(10) Patent No.: US 8,176,002 B2
(45) Date of Patent: May 8, 2012

(54) METHOD AND SYSTEM FOR USER ALTERATION OF THE CONFIGURATION OF A DATA WAREHOUSE

(75) Inventors: Shawn M. Murphy, Seattle, WA (US); Alan B. Auerbach, Sammamish, WA (US); German A. Gil, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1877 days.

(21) Appl. No.: 11/088,583

(22) Filed: Mar. 24, 2005

(65) Prior Publication Data

US 2006/0218159 A1 Sep. 28, 2006

(51) Int. Cl.
*G06F 17/00* (2006.01)

(52) U.S. Cl. ........ 707/602; 707/600; 707/674; 707/687; 707/736; 707/758; 707/790; 715/700

(58) Field of Classification Search .................. None
See application file for complete search history.

(56) References Cited

U.S. PATENT DOCUMENTS

| | | | |
|---|---|---|---|
| 6,289,382 B1 * | 9/2001 | Bowman-Amuah | 709/226 |
| 6,308,168 B1 * | 10/2001 | Dovich et al. | 707/1 |
| 6,714,979 B1 * | 3/2004 | Brandt et al. | 709/225 |
| 6,910,070 B1 * | 6/2005 | Mishra et al. | 709/224 |
| 7,107,285 B2 | 9/2006 | von Kaenel et al. | |
| 7,493,265 B2 * | 2/2009 | Fagan et al. | 705/3 |
| 7,506,001 B2 * | 3/2009 | Johnson et al. | 707/792 |
| 7,814,142 B2 * | 10/2010 | Mamou et al. | 709/203 |
| 2002/0087633 A1 * | 7/2002 | Nelson | 709/204 |
| 2002/0099563 A1 * | 7/2002 | Adendorff et al. | 705/1 |
| 2002/0133368 A1 * | 9/2002 | Strutt et al. | 705/1 |
| 2003/0105761 A1 * | 6/2003 | Lagerman | 707/10 |
| 2004/0210607 A1 * | 10/2004 | Manchanda et al. | 707/203 |
| 2005/0010550 A1 * | 1/2005 | Potter et al. | 707/1 |
| 2005/0102273 A1 * | 5/2005 | Gupta | 707/2 |
| 2006/0112109 A1 * | 5/2006 | Chowdhary et al. | 707/100 |

OTHER PUBLICATIONS

Stotte et al, "Query, Analysis and Visualization of Hierarchically Structured Data Using Polaris", AMC, Edmonton, Alberta, Canada, 2002, pp. 112-122.*
U.S. Appl. No. 11/084,621, Murphy et al.

* cited by examiner

*Primary Examiner* — Hung Le

(57) ABSTRACT

Disclosed are methods usable by non-experts for altering a configuration of a data warehouse. The initial configuration of the data warehouse is represented in terms of metadata, and that metadata configuration is presented to a user. The user can choose to alter the metadata configuration. If alterations are made to the metadata, then the underlying configuration of the data warehouse is altered accordingly. Because there may be multiple users wishing to alter aspects of the data warehouse, some embodiments of the present invention enforce approval guidelines so that proposed changes to the data warehouse configuration are only implemented after the appropriate approvals have been secured. By presenting a metadata representation of the data warehouse configuration, the present invention both allows non-experts to have a hand in converting a data warehouse and prevents user errors from corrupting the data warehouse conversion process.

12 Claims, 5 Drawing Sheets

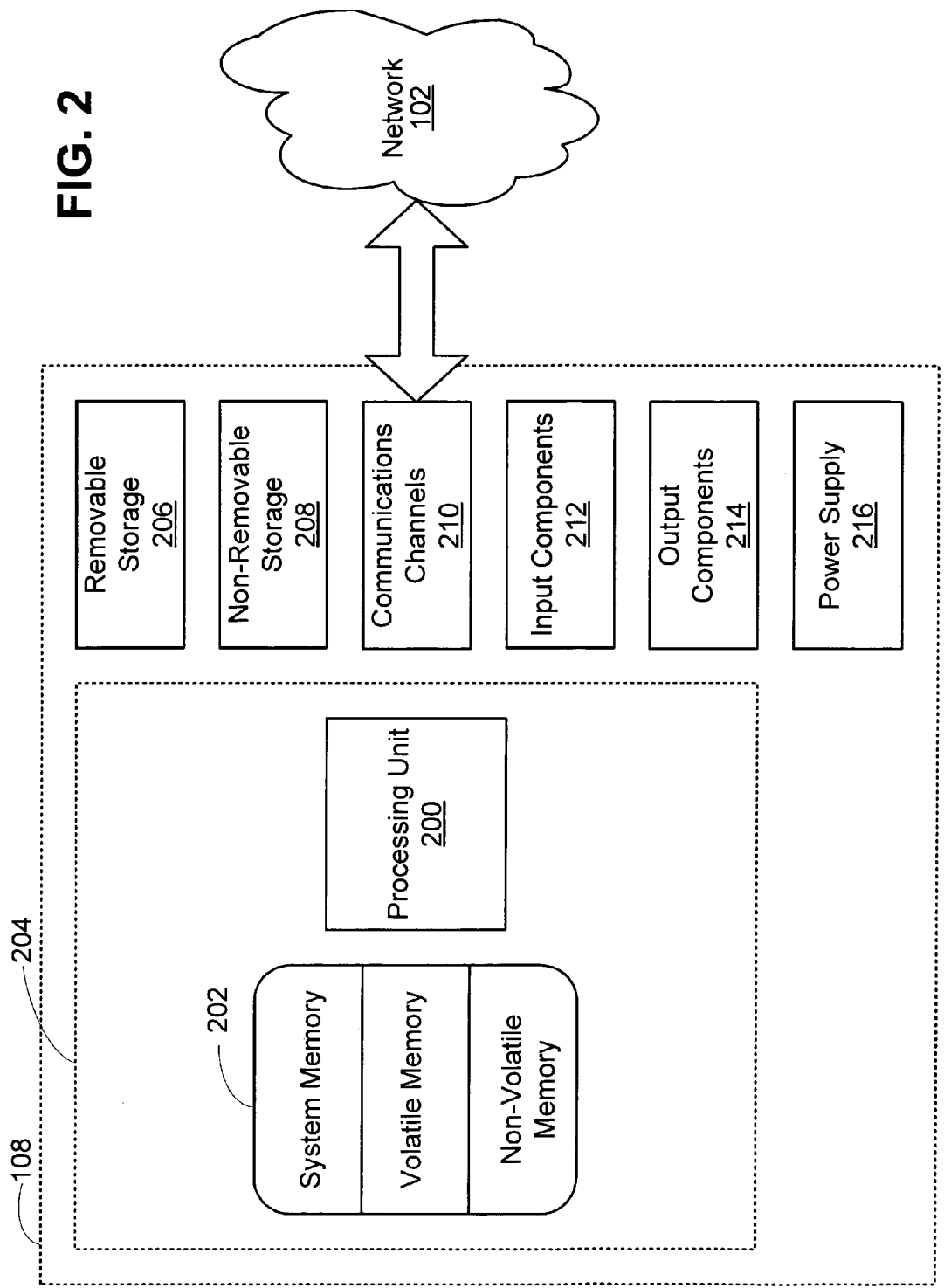

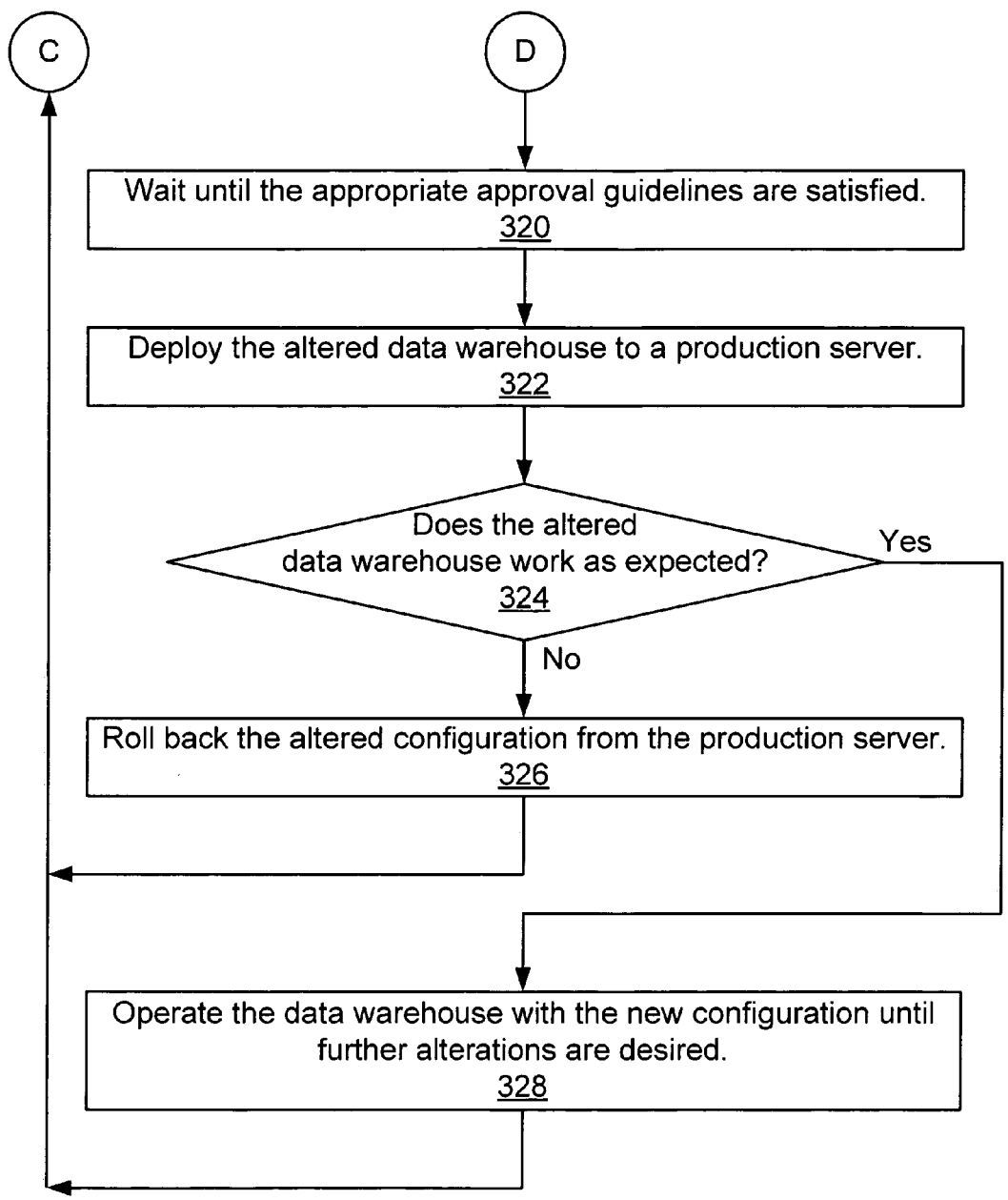

METHOD AND SYSTEM FOR USER ALTERATION OF THE CONFIGURATION OF A DATA WAREHOUSE

RELATED APPLICATION

The present application is related to U.S. patent application "Method and System for Altering the Configuration of a Data Warehouse," Ser. No. 11/084,621.

TECHNICAL FIELD

The present invention is related generally to the configuration a data warehouse, and, more particularly, to tools for simplifying the configuration of a data warehouse.

BACKGROUND OF THE INVENTION

Software analysts are relying more and more on "data warehousing" in order to collect and to interpret massive amounts of external data. As one scenario in which data warehousing represents an advance over previous techniques, consider a manufacture of a consumer product that must continually improve its product offering in order to remain competitive in the marketplace. To do this, the manufacture would like to know how its customers actually use the product. In the past, the manufacturer could employ a "focus group" where people would use the product in a simulated setting and then provide specific comments to the manufacturer. The information collected from the focus group could be combined with data gleaned from calls to the manufacturer's product support center. Together, this information provided valuable insight into the strengths and shortcomings of the product.

While still useful, these techniques fail to capture the full range of user interactions with the product. First, by relying on customers' descriptions of their product usage, these techniques present usage patterns that are always incomplete and that are often simply incorrect. Second, and more seriously, these techniques cannot reflect the large proportion of usage that is not reported. For example, rather than calling for product support, many customers simply give up when they cannot understand how to use a feature, or they may develop an alternative method to achieve their desired result, an alternative not considered during the manufacturer's development. Third, seldom used features of the products may not produce enough usage data to be meaningful, even though those features may be vital to an important segment of the user population. Fourth, if the product is usable in many different computing environments, then these traditional techniques usually miss the nuances of the effects of those environments on the product's patterns of use. In short, the feedback provided to the software manufacturer by traditional methods of product analysis is often too generalized. By failing to capture comprehensive usage patterns, these techniques fail to adequately support the manufacturer's desire to quickly improve its products to meet ever changing user demands.

In order to obtain up-to-date performance and usage data from a statistically significant population of users, software products can now constantly monitor themselves while they run. These products produce datapoints containing measurements of a status, condition, action, event, or other property of the product or of its working environment. The datapoints are sent to a data warehouse at a central computing facility for processing and analysis. The manufacturer then queries the data warehouse to obtain timely and precise feedback about how its products are used in the real world.

The above description intentionally simplifies the intricate, but well known, process by which raw datapoints are converted into useful information in the data warehouse. This processing of raw datapoints as they enter the warehouse provides many of the strengths of data warehousing. By processing the raw datapoints in predefined ways, the data warehouse continuously creates information to support answers to queries posed to the data warehouse. This processing makes the data warehouse much more responsive when queried than would be a traditional database of raw datapoints which would have to process its contents to develop an answer for each query, a clearly infeasible task when confronted with massive amounts of usage data. As another benefit, which is very important when the raw datapoints are provided by a population of consumers, the processing removes any personally identifying information found in the raw datapoints, preventing the data warehouse from tracking individual usage, but still allowing the data warehouse to uncover important usage trends.

However, the benefits of processing the raw datapoints come at a cost. To set up the processing, the data warehouse is carefully configured before it can begin to accept incoming datapoints. This configuration, and any reconfiguration needed to support a new set of queries, has required the services of a select group of data warehousing experts. Depending upon this group both increases the costs of configuring the warehouse and limits the speed with which the data warehouse can be reconfigured.

SUMMARY OF THE INVENTION

In view of the foregoing, the present invention provides an interface usable by non-experts for altering a configuration of a data warehouse. The initial configuration of the data warehouse is represented in terms of metadata, and that metadata configuration is presented to a user. Through the interface, the user can view and alter the metadata configuration. If alterations are made to the metadata, then the underlying configuration of the data warehouse is altered accordingly. By presenting a metadata representation of the data warehouse configuration, the present invention allows non-experts to have a hand in converting a data warehouse.

In some embodiments, the user interface is web-based. The user interface can include both a "cube editor" through which the user views and alters dimensions and measures of the cubes of the data warehouse and a "datapoint editor" for altering variables, record details, and the legacy status of datapoints.

Because there may be multiple users wishing to alter aspects of the data warehouse, some embodiments of the present invention associate portions of the configuration metadata with particular users. A user is notified whenever a change is made to metadata "owned" by that user. Relatedly, some embodiments of the present invention enforce approval guidelines so that proposed changes to the data warehouse configuration are only implemented after the appropriate approvals have been secured.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 2 is a schematic diagram generally illustrating an exemplary computing device that supports the present invention; and FIGS. 3a, 3b, and 3c together form a logic flow diagram of a process according to the present invention for altering the configuration of a data warehouse.

DETAILED DESCRIPTION OF THE INVENTION

Figure 1:
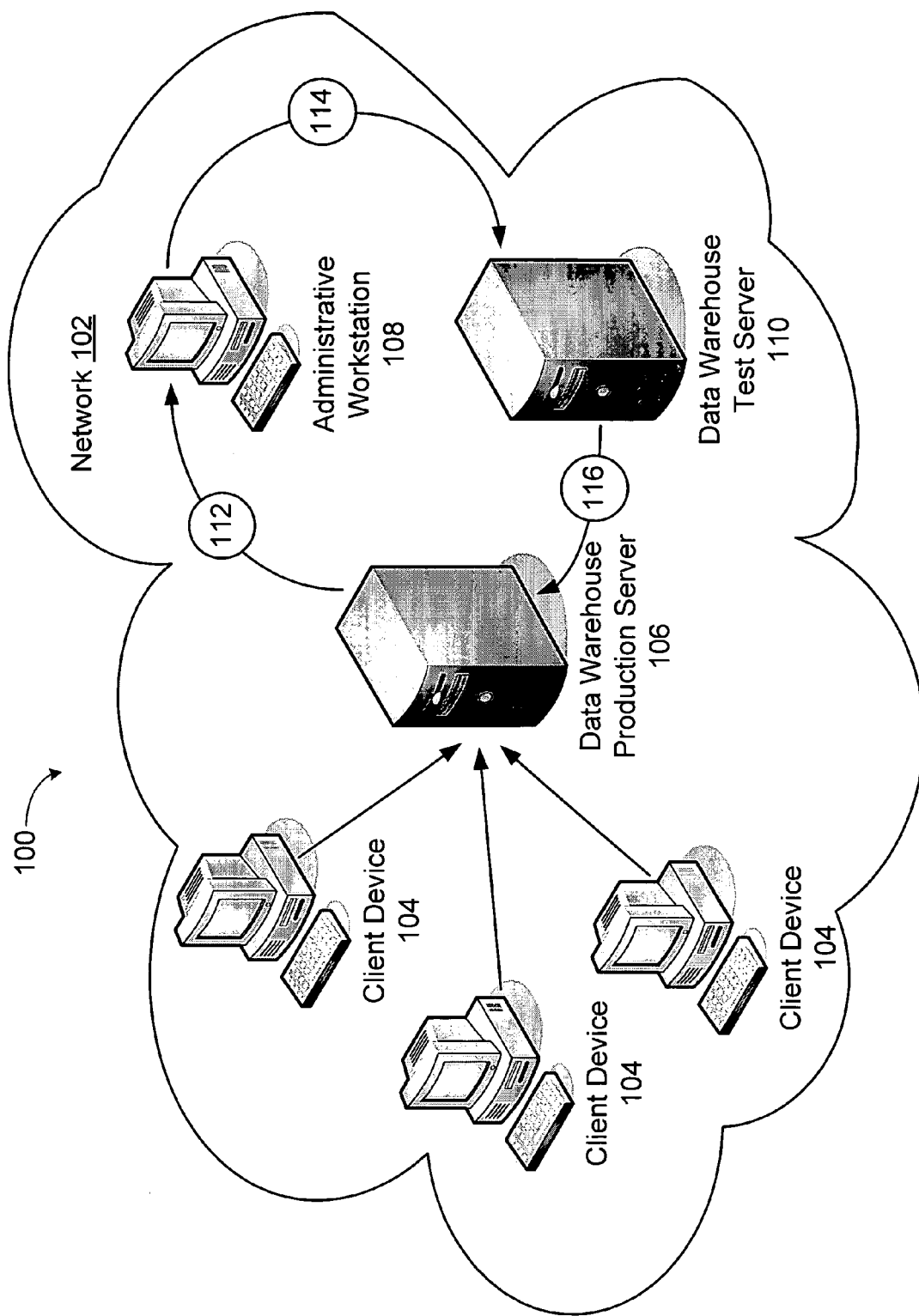
FIG. 1 is a block diagram of a data warehousing environment including client computing devices and a test server.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the environment surrounding the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Architectural and Procedural Overview

FIG. 1 shows an exemplary data warehousing environment 100. By means of a data communications network 102, several client devices 104 deliver measurements of aspects of their own performance to a data warehouse production server 106. In one example, the client devices 104 are measuring usage patterns of commercial software running on them. In other examples, the data sent to the data warehouse 106 could be measurements of a manufacturing process, evidence of a disease outbreak, or economic and social intelligence. The present invention is in no way limited by the specifics of this information.

FIG. 1 also shows an administrative workstation 108, usable to view and to alter the configuration of the data warehouse 106, and a data warehouse test server 110, usable to verify an altered configuration. Arrows 112, 114, and 116 hint at the process of altering a configuration: The current production configuration is displayed on the administrative workstation 108 for review (arrow 112), any alterations made by the administrator are verified on the test server 110 (arrow 114), and, upon acceptance, the alterations are deployed to the production server 106 (arrow 116).

FIG. 1 is merely meant to introduce the data warehousing actors and their inter-relationships for the sake of the discussion below. Consequently, the portrayed environment 100 is greatly simplified. The intricacies involved in setting up and running a successful data warehousing environment 100 are well known to those working in this field.

The computing device 108 of FIG. 1 may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Neither should the computing device 108 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In its most basic configuration, the computing device 108 typically includes at least one processing unit 200 and memory 202. The memory 202 may be volatile (such as RAM), non-volatile (such as ROM or flash memory), or some combination of the two. This most basic configuration is illustrated in FIG. 2 by the dashed line 204. The computing device 108 may have additional features and functionality. For example, it may include additional storage (removable and non-removable) including, but not limited to, magnetic and optical disks and tape. Such additional storage is illustrated in FIG. 2 by removable storage 206 and by non-removeable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device 108. Any such computer-storage media may be part of the computing device 108. The computing device 108 may also contain communications channels 210 that allow it to communicate with other devices, including devices on the network 102. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include optical media, wired media, such as wired networks and direct-wired connections, and wireless media such as acoustic, RF, infrared, and other wireless media. The term "computer-readable media" as used herein includes both storage media and communications media. The computing device 108 may also have input devices 212 such as a touch-sensitive display screen, a hardware keyboard, a mouse, a voice-input device, etc. Output devices 214 include the devices themselves, such as the touch-sensitive display screen, speakers, and a printer, and rendering modules (often called "adapters") for driving these devices. All these devices are well know in the art and need not be discussed at length here. The computing device 108 has a power supply 216.

Before presenting methods according to the present invention, a few definitions are in order.

"Aggregated data" are compilations into sets of statistical significance of the raw data sent by client devices 104. The processing of raw data into aggregated data removes the possibility of identifying individual behavior.

A "cube" is a specialized type of database that optimizes the manipulation and storage of related data.

A "datapoint" is a basic measurement unit that holds information representing a quantity or measure of a reporting application. Examples of datapoints include a number of favorites, a length of time that a user keeps the dial-up properties window open, and the screen resolution of the user's monitor.

A "data warehouse" stores aggregated data after a processing server has completed manipulating the raw data.

An "environment" is a set of computing devices that together support a data warehouse. Different embodiments contain different numbers of processing servers, a processing database, input folders that contain data warehouse files to be processed, output folders that contain processed files, data warehouse servers, a data warehouse database, and reporting servers.

To "make legacy" is to mark a datapoint as no longer to be used in a future version of the reporting applications, but still relevant to the shipping version. Older clients 104 continue to report legacy datapoints, and the legacy datapoints are still processed.

"Metadata" are data that describe in a general way the structure of a data warehouse.

A "dimension" provides the descriptive or analytical view of numeric data in an OLAP cube. When a report is created from a data cube, the data are grouped by dimension. Examples of dimensions include a number of skins and a geographic location.

"Mapping" is the process of associating datapoints with their collection of Transformed Datapoints.

A "measure" is the numeric information of primary interest to people who read reports from the data warehouse. Essentially, measures are the things that are counted. Examples of measures include a number of hangs and a number of crashes.

"OLAP" stands for Online Analytical Processing, a technology for extracting meaningful intelligence from the binary data collected by the client devices 104.

A "package" includes the files, sometimes XML files, that describe actions to be performed by deployment tools when installing a new configuration on a previously defined environment.

"PII" means Personally Identifying Information, which is any information that either directly identifies or indirectly identifies an individual.

"Raw data" are any data that have not yet been processed into an appropriate fact table.

A "report" is a graphical or tabular presentation of information based on the data collected in the data warehouse.

A "schema" is an expression of a shared vocabulary between a plurality of components that allows the components to transfer and process data according to the expressed shared vocabulary. For example, an XML schema can define and describe a class of XML documents using schema constructs (e.g., name/value pairs) of an XML schema language. These schema constructs can constrain and document the meaning, usage, and relationships of data types, elements and their content, attributes and their values, entities and their contents, and notations.

A "Transformed Datapoint" is a server-side name for information generated from a datapoint. Transformed Datapoints can have a one-to-one relationship with a datapoint or a many-to-one relationship with datapoints.

Figure 3A:
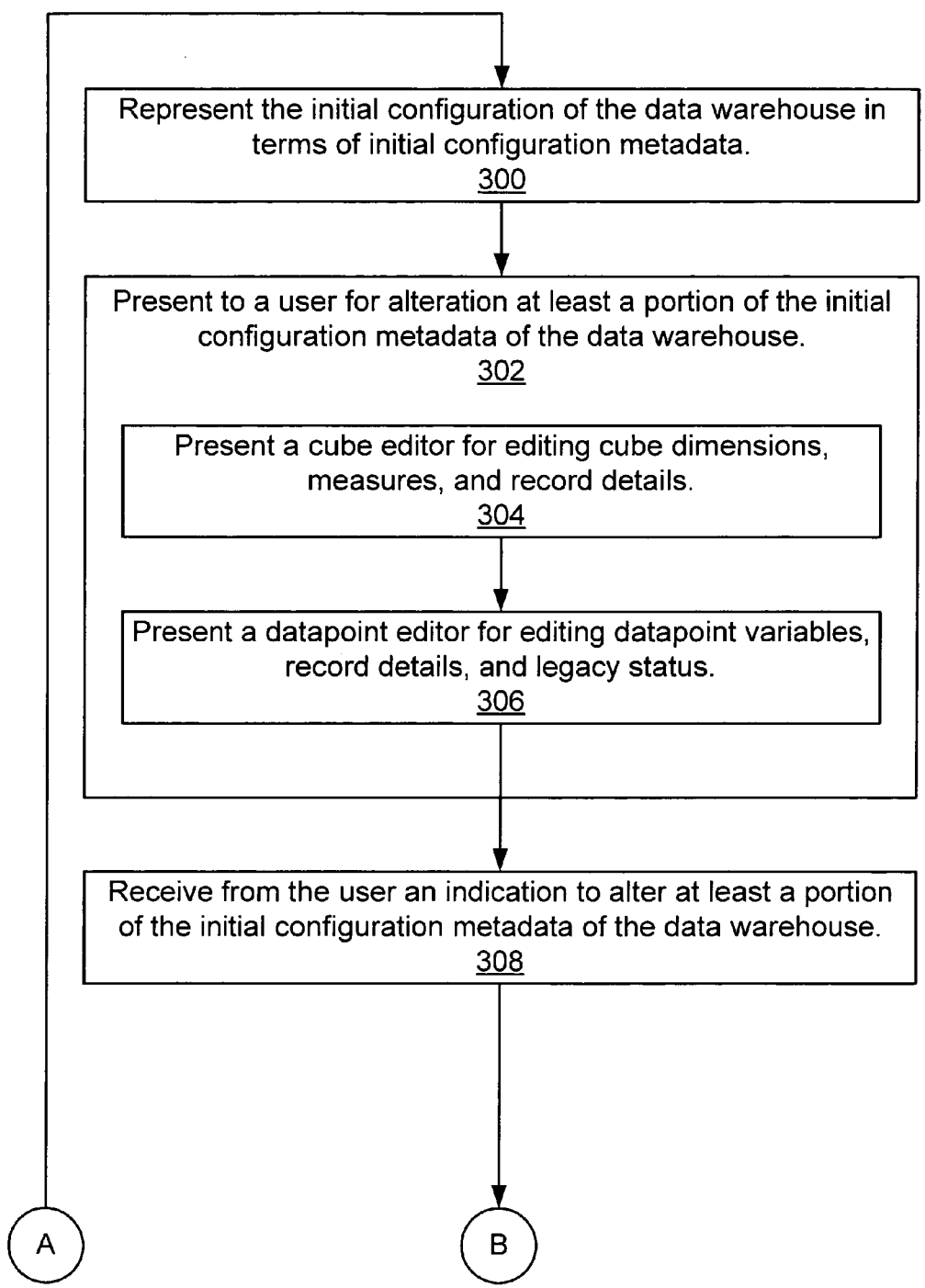
Figure 3B:
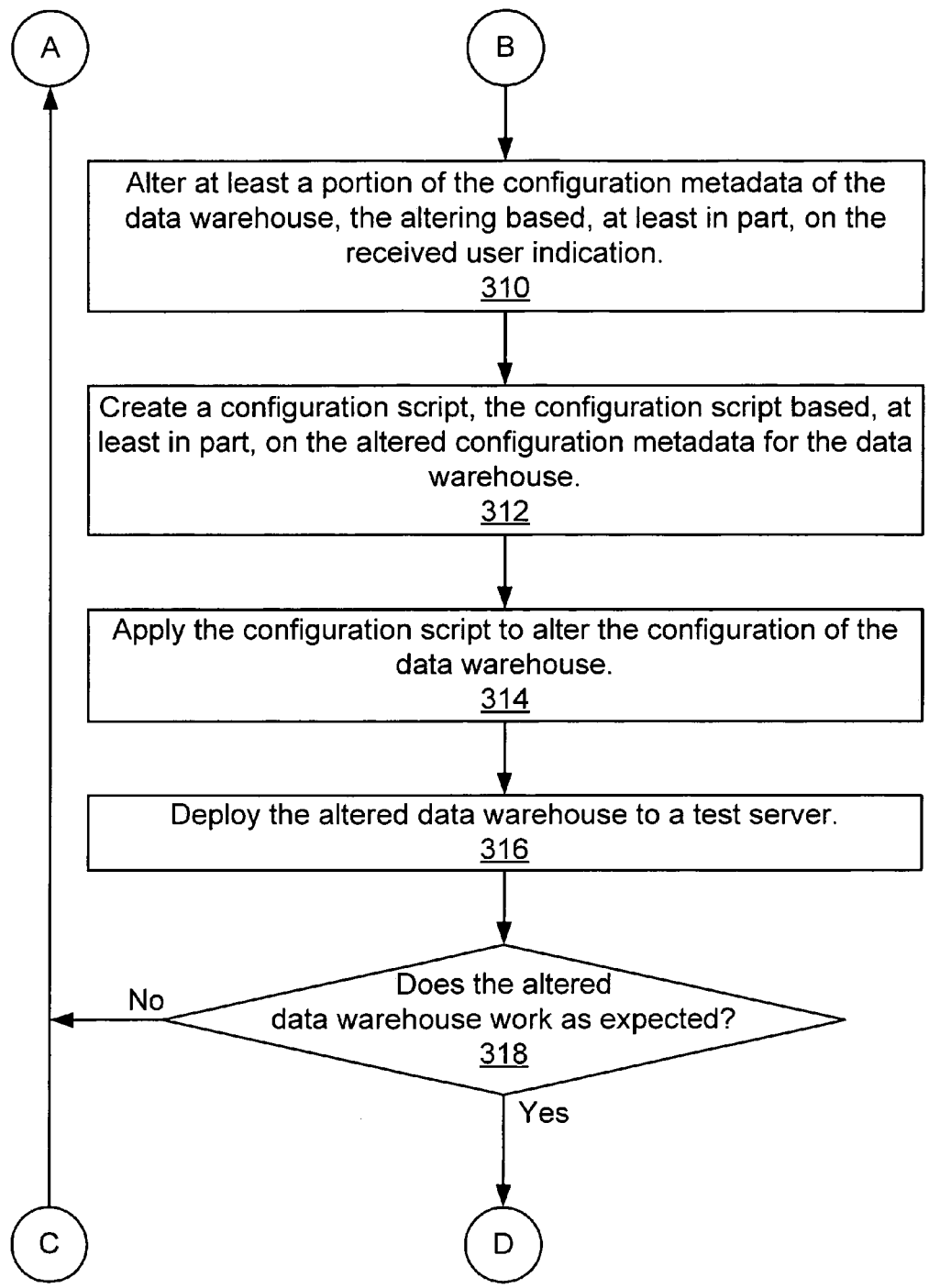

FIGS. 3a, 3b, and 3c present an example of how the configuration of a data warehouse is altered. The process of these figures is both over- and under-inclusive: over-inclusive because it includes steps that are left out in some embodiments, and under-inclusive because it leaves out steps and details that are well known to those in the art.

In step 300 of FIG. 3a, the data warehouse is up and running on the production server 106 with what is here called its "initial" configuration. (There is nothing special about this "initial" configuration: The word "initial" is used simply to distinguish the configuration in step 300 from a configuration after alterations are made. As is discussed below, the configuration of the data warehouse can change repeatedly.) Because the underlying configuration schema of a data warehouse can be very complicated, understandable only by experts, in some embodiments this configuration is represented in terms of "metadata" that are much more easily understood. These embodiments allow data warehouse users that are not experts to view and to alter at least some aspects of the data warehouse. An example of metadata representations is discussed in a separate section below.

Presented with the current configuration of the data warehouse, a user can choose to alter some aspects of that configuration in step 302. Several tools may be used in parallel or in sequence to alter various aspects of the configuration. Step 302 presents two important tools as examples, the cube editor in step 304 and the datapoint editor in step 306. Example implementations of these tools are described below in separate sections. In any case, the user applies these or other tools to indicate how the configuration of the data warehouse should be changed. The user's desired alterations are noted in step 308.

In step 310 of FIG. 3b, the metadata representation of the data warehouse configuration is altered in accordance with the user's desires. Note that at this point in the process, the production server 106 has not been affected by the user's alterations and that, indeed, the underlying configuration of the data warehouse has not been altered.

In some embodiments, the user's alterations are captured in a configuration script (step 312). This script can be created by folding the user's alterations into the initial configuration, in either underlying or in metadata form. Because data warehouses are so complicated, the mechanics of changing their configurations have traditionally been prone to human error, even when performed by experts and even when the required alterations are thoroughly understood. By automating the creation of the script, which will in turn be used to automate the actual configuration alteration, many of these errors are prevented, and the need for expert involvement diminishes.

In some embodiments, the configuration script is actually a set of scripts, each individual script altering particular aspects of the data warehouse. These scripts can be written in terms of well known languages such as SQL or XML.

The script (in those embodiments that produce one) or a data warehouse expert alters the data warehouse configuration in step 314.

Normally, the altered configuration is first deployed to a test environment 110 and carefully verified (step 318). If everything works as expected in the test enviromnent 110, the altered configuration is still not deployed to the production server 106 until an appropriate approval process is completed in step 320 of FIG. 3c. The approval process can take many forms including any of the well known procedures for approving a new release of commercial software.

Upon approval, the altered configuration is deployed to the production server 106 (step 322). Because the artificial test environment 110 probably cannot completely mimic the production environment 106, it is possible that some errors in the altered configuration will show up in production that were not found during testing (step 324). If so, then the production data warehouse is "rolled back" (step 326) to it previous configuration (the "initial" configuration of step 300), and the user's desired alterations are subjected to further scrutiny. The script created in step 312 can help with the roll back, either directly or as a model for creating a rollback script. Depending upon the particular configuration of the data warehouse, some data may be lost during the roll back.

If the altered configuration works as expected in the production environment 106, then that configuration is used until a user desires to make further alterations (step 328 and going back to step 300).

The Metadata Database

Pipeline Management is a set of processes, tools, and best practices that product teams use to determine what in their product should be instrumented, to track and manage those datapoints, and then to design, manage, and maintain the data that are processed and collected. Pipeline management is based on managing and controlling metadata that describe how incoming data should be processed. For simplification, the management partitions the various settings into five key concepts which are represented in the database as objects: datapoint, Transformed Datapoint (how raw measurements are processed for reporting), cube, report, and namespace.

The database itself can be divided into two kinds of tables: tables devoted to storing the actual data and tables devoted to storing schema information about the structure of the data.

The database has been denormalized in certain cases in the interests of performance. Specifically, whenever possible, foreign keys for fields that are represented as strings in the UI (user interface) point to the actual value of the field, rather than an integer ID that points to a record in the parent table containing the actual value. It is less expensive to define keys on varchar fields then it is to do a large number of joins when performing a query to collect data to display in the UI.

The standard pattern for storing information about an object takes the form of two tables: a Current table stores up-to-date information about the object, and a History table stores previous versions of the object. The schema of these tables is mostly identical, although History tables have a ChangeID field to track changes.

Schema tables are used in the web UI to generate views on the data. They describe the various fields for each record, who is allowed to edit them, how they appear in the UI when editing is allowed, how they are grouped in the UI, etc. The information in these tables applies to the fields for each object, rather than to the actual data stored in those fields. Some of this information (e.g., data type and whether the field is freeform or enumerated) could have been inferred from the structure of the data tables themselves. However, some information (e.g., which particular type of UI element should be used for data entry) could not be inferred from the data table schema, hence the creation of separate tables to store this information.

When a partner creates a custom field, an entry for that field is placed in the metadata tables, so that the field will appear in the Record View/Edit UX. Field values for particular instances of an object are stored in a special Custom table for that object. Each record in this table contains separate fields for the case when the field is freeform, enumerated, or boolean. A special table stores the enumerated values for each custom field when necessary.

The database maintains a history of all changes that have occurred. History is recorded for all record modifications so that the record's history can be audited and, if needed, rolled back to a previous point in the record's history.

When a record is edited, the following occurs: (1) If this is an existing record, then a copy of the record in Current is added as a row to the History table, and (2) If this is an existing record, then the record in Current is updated, otherwise, a new record is inserted into the Current table.

For each record in the History table, the following information is stored: (1) the fields that changed or a snapshot of the record, (2) who made the change (if it was a person, then the username, if it was automation, then the name of the application), (3) a timestamp of when the change was made, and (4) how the change was made.

In addition to recording the history of edits for each record, the database should also store a history of actions taken by the workflow either to document the automation or to document critical operations related to the record which are not modifications to the record's data. These actions are: status mail sent, change mail sent, and deployment to pipeline occurred.

Every database transaction executed by the Pipeline Management website should be accessible as an API so that users can write automation directly against the database. These APIs should enforce the same validity and workflow constraints and process as used on the Web UT. Examples of transactions that should be supported as APIs are: (1) creating or modifying datapoints and Transformed Datapoints, (2) creating reports, (3) executing search queries, (4), signing off on datapoints, and (5) propping pipeline configuration.

The database contains the following stored procedures. "AddBucket" adds a bucket to a Transformed Datapoint. "AddMapping" adds a mapping to a Transformed Datapoint. "ClearBuckets" deletes the buckets assigned to a Transformed Datapoint. "ClearMappings" deletes the mappings assigned to a Transformed Datapoint. "DeleteDatapoint" removes the datapoint from the Current table. "DeleteTransformedDatapoint" removes the Transformed Datapoint from the Current table. "GetCodeTableRecords" gathers up records from code tables, like Status and Application, into one table. This procedure is used on the Search page for binding to dropdowns. "GetDimensionsByFeature" retrieves a list of those Transformed Datapoints which can be used as dimensions and are associated with a datapoint within the requested feature. It is used in the picker control. "GetMeasuresByFeature" retrieves a list of those Transformed Datapoints which can be used as measures and are associated with a datapoint within the requested feature. It is used in the picker control. "GetEditableFields" queries the metadata tables to figure out which fields the current user is allowed to edit in the UI. "GetUserRoles" queries the metadata tables to return the roles to which the current user belongs. "SignoffOnDatapoint" allows the user to signoff on a datapoint. "UpdateDatapoint" updates the corresponding record in Datapoint, or inserts if it does not already exist. It also stores an older version in the History table if applicable. "UpdateTransformedDatapoint" updates the corresponding record in a Transformed Datapoint or inserts it if it does not already exist. It also stores an older version in the History table if applicable.

The database has the following views. These are generally used for read-only queries. "BucketViewCurrent" lists current buckets for discrete Transformed Datapoints. "DatapointSignoffView" lists current signoffs for datapoints. "DatapointViewCurrent" lists current versions of datapoints. "MappingViewCurrent" lists current mappings for continuous Transformed Datapoints. "StreamPositionViewCurrent" lists stream information for datapoints. "TransformedDatapointViewCurrent" lists current versions of Transformed Datapoints.

The Cube Editor

The Cube Datastore Editor allows SQM Integrators to define a set of OLAP Cubes to optimize the performance of their team's reports. ("SQM" means Service Quality Monitoring, a particular type of data warehouse.) By pre-aggregating the data, OLAP Cubes provide a key component to the reporting story for Pipeline Management.

Because cubes are designed to optimize the performance of the SQM reports, the vast majority of cubes are created after the product ships based on usage information for the reports.

The OLAP Cube Editor enables SQM Integrators and Local Data Analysts to create and manage datapoints as dimensions and measures in OLAP cubes. The cube editor should be accessible from the search results UI for searches that were executed to find cubes. In principle, the cube editor UI is very similar to the reporting UI as both have some general options, dimension list, measure list, and a preview and report surface.

By default, whenever the cube editor is opened the record details are collapsed thus enabling editing of most cubes to happen without any content in the cube definition panel to extend below the fold. When a user needs to edit record details, such as the cube name or the retention policy, the fields can be expanded from the toolbar. Expanding the record fields may mean that some of the cube definition or list controls contents fall below the fold of the page.

Assuming that the user has appropriate permissions to edit a cube, all of the controls, fields, and views on the page are populated from the database. The record is placed into an edit mode where the field values are in editable controls, and all of the toolbar controls are active. If the user does not have access to edit cubes, then he sees the page in read-only mode. All of the form fields are read-only and control controls like "save" and "delete" are disabled.

The behavior of the page is slightly different if the user is creating a new cube from scratch. When creating a new cube, the default is to expand the record details. Like any record editor on the site, any field that has a default value is populated with that default, and the remaining fields are null.

The Dimension and Measure lists are only populated with the common dimensions and measures for that namespace (as defined in the database). To start adding non-common dimensions and measures, the user needs to use the appropriate controls in the dimension and measure list control (defined below).

The toolbar provides the user with the basic controls required to manipulate the cube record. The entire toolbar itself is composed of three smaller toolbars: the Document Tabs Toolbar, the Main Toolbar, and the State Toolbar. The Document Tabs Toolbar enables the user to easily edit and manipulate multiple cubes simultaneously. The Main Toolbar contains basic controls. "New" opens up the creation process for a record. "Save" saves the current changes to the database. This should be disabled when the user cannot save or when there are no changes to save. "Delete" deletes the cube from the current table and initiates a "save," but maintains the cube in the history. "Email Owners" opens a new email message in the default mail client addressed to the record owners. "History" displays the History record details node. "Help" opens the help pane. The State Toolbar shows the status and the next step (if any) required for the cube to be released to production. If the user is unable to perform any of the toolbar actions on the toolbar (either due to security or to the state of the cube record), then those actions should be in a disabled state.

The Dimension and Measure List is the same control that is used on the reporting UI to select the dimensions and measures to appear on the report. The control lists all of the available dimensions (at any status other than legacy) grouped by feature area. Clicking any item in the list is the same as toggling the checkbox next to the item which causes that item to be added or removed from the cube definition. Hovering over a dimension in the list displays a tooltip containing the description of that dimension. Clicking the "Add . . . " control at the top of each list opens the Picker scoped to dimensions or measures (any status but legacy) so that the user can select either an item or a feature area bucket. If the user selects an item, then (1) that item is added to the cube definition, and (2) the item's feature area is added to both the dimension and measure lists. If the user selects a feature area, then that feature area is added to both the dimension and measure lists. If a feature area does not have any checked items, then the area should continue to appear in the list control throughout the remainder of the editing session. If a dimension or measure is removed from the cube via the controls in the cube definition and preview region, then that item's checkbox in the list should be unchecked.

Right clicking exposes a context menu containing the following items: (1) "View Transformed Datapoint details" opens the record for that Transformed Datapoint in a separate window, and "View Datapoint details" opens the record for the datapoint behind the Transformed Datapoint in a separate window. This option is disabled for complex Transformed Datapoints.

Cube Definition and Preview is the actual editing surface for manipulating the dimensions and measures in the cube definition. The "Current Cube Configuration" lists the current definition of the cube and provides additional mechanisms for the user to remove a dimension or measure from the cube. Un-checking the checkbox next to the item in the preview is the same as un-checking that item in the dimension and measure list: (1) If the item being removed is not part of the OLAP cube in the production warehouse, then the item is simply removed from the cube definition, (2) If the dimension or measure is part of a cube in production, then that item contains data that will be deleted from the production cube during the next deployment. When the remove control is clicked the page removes the item from the current cube definition and places it into the list of dimensions and measures marked for deletion. By moving the item to the mark for deletion list, the editor simultaneously gives the user feedback that data will be removed from the cube and provides them with a mechanism to undo the action. Clicking on the name of the dimension or measure should open that record's details in a new window.

The "Dimensions and Measures Marked for Deletion" lists those dimensions and measures that are being removed from the cubes, but for which data will be deleted from the production OLAP cube in the process. Items in this list contain a checkbox that allows the user to select the items they wish to un-delete. When an item is checked, then the button goes from a disabled to an enabled state. Clicking on the undelete button (1) un-marks all selected items for deletion, (2) adds all the selected items to the current cube configuration, and (3) checks the checkbox in the dimension and measure list for the selection items. Clicking on the name of the item opens that item's record details in a new window. The "Dimension" and "Measure" headings should only appear if there is a dimension or measure (respectively) marked for deletion—in other words there should never be an empty heading.

When changes made to the cube result in adding too many dimensions or measures, the preview area provides a visual warning and indication. This warning appears when a cube has more than fifteen dimensions or ten measures. In addition to the warning text, all dimensions and measures in the cube exceeding the recommended size are shown in red. Cubes with more than fifteen dimensions can have performance problems resulting from the size of the database. Whether this cube will suffer performance issues depends on the number of values in each dimension and how frequently data are added. Cubes with more than ten measures can have performance problems resulting from the size of the database. Whether this cube will suffer performance issues depends on the number of values in each dimension and how frequently data are added.

In some cases, the edits a user makes to a cube will cause data to be deleted from the cube. In these scenarios, the cube editor presents the user with a save confirmation to confirm the action before it is committed to the database. The confirmation page (1) warns the user of the impact, (2) illustrates the impact of the changes, and (3) provides controls to continue to save or to go back.

If the user attempts to save a record and the record does not pass validation checks, the user is re-presented with the record with (1) an error message summarizing the changes needed, (2) the nodes with the errors highlighted, (3) the fields with the errors highlighted, and (4) below the field name, a concatenation of the field description and error text (if any). Once these errors are fixed, the user can re-click "Save" and attempt to submit the corrected record to the database.

Where the Summary of change blocks are displayed as made relevant by the changes in the cube (1) Cube Deleted, all of the data stored in this cube, including the cube itself, will be deleted, (2) Change to Retention Policy, the data for n days will be deleted from the cube because the retention policy is now a Retention Policy of Window Size, (3) Dimensions Deleted, the user is explicitly deleting the following dimensions from this cube (list of dimensions), (4) Measures Deleted, the user is explicitly deleting the following measures from this cube (list of measures). When the user clicks "Yes," the changes are saved and the user is navigated back to the cube editor. Clicking on "No" navigates the user back.

Because the management tool is web-based, it is possible for two users to make an edit to the same record and to enter a race condition where the second user's save would overwrite that of the first user. To prevent this, each record contains a version stamp to ensure that a record post is only accepted if the user is editing the most recent version of the record.

The Management Reports should include the following about cubes: (1) Basic Performance Statistics (1)(a) size, (1)(b) performance, (2) Reports Optimized (2)(a) number of saved reports optimized with this cube, (2)(b) percent of report requests optimized with this cube, (3) Automated Recommendation (3)(a) green (good optimization), yellow (moderate optimization), or red (poor optimization), (3)(b) yellow/red reason (why the cube got this rating), (4) Cube Performance Report, (5) Cube Growth Report, and (6) Un-Optimized Popular Reports.

The Datapoint Editor

The Datapoint/Transformed Datapoint UX is the experience around creating, editing, and managing a Datapoint and its associated Transformed Datapoint. The overall user experience UX for Datapoints and Transformed Datapoints is broken down in the following major UI elements: Datapoint/Transformed Datapoint Creation Wizard, Datapoint Record Editor, and Transformed Datapoint Record Editor. The Datapoint and Transformed Datapoint editing UI differ only in the database fields that they display. The UI controls and behaviors are identical between the two record editors.

The detailed record editors have several known entry points: (1) search result, (2) associated Datapoint control on Transformed Datapoint editor, (3) associated Transformed Datapoint control on Datapoint editor, (4) "Get Details" context menu item on report and cube editor pages, and (5) links embedded within the status and change emails.

The editor itself is always displayed in a narrow new window and is broken up into a toolbar at the top of the page, individual record detail nodes, and a duplicate toolbar at the bottom of the page. The title bar of the window is "Object-Name Details," where Object-Name is the name of the object in the current record. With the exception of the record navigation toolbar (next, back, and jump controls), any links on the page open up in new windows.

The toolbar provides the user with basic controls required to manipulate the cube record. The entire toolbar itself is composed of three smaller toolbars: the Record Navigation Toolbar, the State Toolbar, and the Main Toolbar. When the user navigates to the record editor from the search results, the Record Navigation Toolbar allows the user to navigate backward and forward through the search results, jump directly to an item, or return to the search page. When the user navigates from anyplace other than search results, the back/forward buttons and jump SELECT control are disabled, but the search control still navigates the user to the search page. The State Toolbar shows the status and the next step (if any) required for the record to be released to production. The Main Toolbar contains basic controls. "New" opens up the creation process for a record. "Save" saves the current changes to the database. This is disabled when the user can not save or when there are no changes to save. When the status is not Active or Legacy, "Delete" deletes the record from the current table and initiates a "save," but maintains the record in the history. When the status is Active, "Make Legacy" applies a signoff of "Make Legacy" and initiates a "save." "Email Owners" opens a new email message in the default mail client addressed to the record owners. "History" displays the History record details node. "Help" opens the help pane. If the user is unable to perform any of the toolbar actions on the toolbar (either due to security or to the state of the record), then those actions are disabled.

Conceptually each record detail node corresponds to a broad category of data associated with the displayed record. Each node contains a heading with the node's name and a series of record fields which correspond 1:1 to fields stored in the database. Clicking on the expand/collapse control in the node name causes that entire node to expand or collapse depending on its previous state. For each field in the record, the Metadata Database stores: (1) the record node displayed within, (2) the field title, (3) the control used for the Record Field Value (valid values, default value), and (4) security access rights. The supported controls on a record editor are: (a) small text field (less than 64 characters), (b) large multi-line text area (four rows), (c) radio button set, (d) SELECT control, (e) signoff control, and (f) Associated Datapoint/Transformed Datapoint Control.

There are several places in the datapoint/Transformed Datapoint UI where the user needs to specify the feature area with which the datapoint or Transformed Datapoint is associated. The feature area for an object is represented in the database by a single value denoting the ID of the node in the feature hierarchy. Since several partners feature hierarchies will contain more than twenty or thirty leaf nodes in the hierarchy—which is the established limit of a usable SELECT control—there is a need to offer a more intuitive control. Visually this control manifests itself as a triple set of SELECT controls that allow the user to progressively drill into the feature area hierarchy. Selecting an application scopes the items in the feature SELECT to only those features in the application. The same process applies for the feature/sub-feature SELECT controls. Programmatically, the control has a hidden control that acts as the form element. The triple set of SELECTs is populated dynamically from an XML manifest of the entire feature area hierarchy. When a user selects an item in the SELECTs, client-side code determines which node in the hierarchy is selected and places that node ID into the hidden form element.

The signoff control lists the current signoffs filed for a record in the order the signoffs should be filed in the ideal Datapoint/Transformed Datapoint process. The required signoffs are listed in the order that they would normally be filed if a partner is using best practices. Signoffs that are required by the workflow, but not yet filed, are visually subdued and lack a checkbox. The signoffs do not have to filed in the ideal sequence. To add a signoff to an individual record, the user clicks the "Add Your Signoff" button. This opens a simple web dialog that allows the user to (if required) select a role, the signoff to apply, and comments about the signoff. The dialog also describes what the user is affirming by adding this signoff and provides a set of buttons to cancel or to add the signoff. Clicking on the "Add Signoff" button closes the web dialog and saves that signoff. If the user attempts to add a "Reject" signoff, then the comments field requires a non-null value. At the top of the signoff affirmation text is a common sentence that states what the user is about to do and sets the stage for the bullets. In the event that the user is adding a signoff state that replaces the state of a trinary signoff (e.g., Approve|Reject|Null), then the dialog adds a warning advising the user that saving this signoff state will replace the already saved state. A checkbox appears next to signoffs filed by the user or the role the user is assigned to (either via ownership or by membership in a security group). This checkbox allows the user to select a signoff to remove. When a checkbox is selected, the "Remove Signoff" button is activated, and clicking on this button removes the selected signoff. In addition to the required signoffs, a record can be signed off by: (a) non-owners where negative signoff blocks deployment, or (b) non-owners with no impact on deployment. If any of these signoffs are filed on a record, then they are respectively placed into the "Other Signoffs That Block Deployment" and "Other Signoffs" buckets. Either of these buckets should only be displayed if there is a signoff within that bucket.

The history of changes to a record is available by toggling the "History" toolbar button. Enabling the history displays the history node which is a visual extension of the toolbar. The saved history states are listed in a list control. Clicking on any of the states causes that state's record to be loaded into a new window in a read-only mode where the current state in the history list is highlighted. Clicking another state in the window hosting the current state causes that state's record to open in the window hosting the other history state. Clicking another state in the window hosting the history causes that record state to be loaded into the same window.

Assuming that the user has the appropriate permissions to edit a record, all of the controls, fields, and views on the page are populated from the database. The record is placed into an edit mode where the field values are in editable controls and all of the toolbar controls are active. If the user does not have access to edit records, then the page is in a read-only mode. All of the form fields are read-only, and controls like "save" and "delete" are disabled.

When a user saves a record, assuming that there are no errors, the user is taken directly back to the saved record. If the user navigates away from a record where changes were made and does not save, then the user is informed that he is about to navigate away from the page without saving the changes.

If a user attempts to save a record and the record fails the validation checks, then the user is re-presented with the record with: (a) an error message summarizing the needed changes, (b) the nodes with the errors highlighted, (c) the fields with the errors highlighted, and (d) below the field name a concatenation of the field description and error text (if any). Once these errors are corrected, the user can re-click "Save" and attempt to submit the corrected record to the database.

Edits to a record can be classified as either "Fundamental" or "Metadata Only." Fundamental edits are edits where the "meaning" or "purpose" of the record has been modified, whereas metadata edits are documentation or non-meaning-changing edits.

Datapoints come in two basic types—normal and stream—and the record edit makes some minor changes depending on whether the record documents a normal datapoint or a stream. In the case of a normal datapoint, there are no changes to the Technical Details node, and the Data Description node applies to just this datapoint. In the case of a stream, an additional field is added to the Technical Description node requesting how many positions wide the stream is. For each of the positions, the Data Description node contains a "mini" node with an added Name field that provides a name for that position. The behavior of each position's mini-node in the Data Description node is identical to the behavior described below.

To properly document the data stored in the datapoint, each of the three values for the continuity field in the Data Description modifies the remainder of the fields in the node. In the continuous case, the user specifies the maximum raw value stored into the datapoint and can optionally specify which, if any, measurement unit the measurement was recorded with. In case of a discrete datapoint, the user can specify which Transformed Datapoint provides the mapping for the raw values. In the bitmap case, the datapoint just needs to document how many bits of the bitmap are in use and which Transformed Datapoint provides the mapping of the bits.

Transformed Datapoints come in two basic varieties: a Simple Transformed Datapoint is based on only one datapoint, and in most cases that datapoint is only used by one Transformed Datapoint, while a Custom Processing Expression is defied using custom expression language which allows great flexibility at the cost of learning the language. As such the entire form changes dramatically depending on the complexity of the Transformed Datapoint.

Datapoint references are used by simple Transformed Datapoints to determine which datapoint they are based on and in the expression language for complex Transformed Datapoints. When selecting a datapoint that a Transformed Datapoint is dependent upon, the picker control should allow the user to select any normal datapoint. Streams should be represented and selected by the stream plus position. Likewise, bits in a bitmap are selected by datapoint plus bit. In other words, a datapoint reference can only be based on one position of a stream (not on the entire stream or bitmap). The picker should list the stream position as StreamName:PositionName as if each position in the stream were a separate datapoint, likewise bits in the bitmap are listed as Datapoint-Name:BitNumber.

The vast majority of Transformed Datapoints created use simple mappings. Whenever the Transformed Datapoint's complexity is simple, the Basic Information node just replicates the name, description, and anomalies fields from the datapoint in READ-ONLY controls. The Technical Details Node allows the user to determine the complexity of the Transformed Datapoint and, if simple, then the dependent datapoint. The fields presented depend on the data continuity of the dependent datapoint. If the Transformed Datapoint is simple and based on a continuous datapoint, then in addition to selecting the datapoint it is based upon, the user has the option of specifying whether the Transformed Datapoint should be used as a dimension, a measure, or both. For all other types of datapoints, the user can only create dimensions so the page only allows the user to specify the datapoint the Transformed Datapoint is based upon.

The UI for defining a dimension depends largely on the type of datapoint the Transformed Datapoint is based upon. At the bottom of every dimension node are a series of common controls that allow the user to (a) add a new mapping to the dimension (except bitmapped), (b) delete the checked mapping from the dimension (except bitmapped), and (c) copy the dimension configuration from an existing Transformed Datapoint. (This opens the picker scoped to Transformed Datapoints based on datapoints of the same type and data description as the current Transformed Datapoint.) New mappings are added to the list when the user populates the blank row and clicks the "Add" button. This causes that mapping to be inserted into the correct location in the list per the sort order for that type of dimension. If a mapping in a dimension has been shipped to a product pipeline, then that mapping can never be edited or modified without causing serious issues with the OLAP cubes. As a result, those mappings are displayed in a READ-ONLY mode. At the bottom of the add control is the list of common, standard dimension mappings. These cannot be edited, deleted, or modified and are included only as a reference. Mappings can be deleted by checking the checkbox that appears next to them. Once a checkbox is checked, the "Deleted Selected" button becomes enabled. Clicking that button removes the checked mappings.

When a Transformed Datapoint is based on a continuous datapoint (and it is used as a dimension), the dimension UI allows the user to define how the data should be quantized. The mapping list is sorted in ascending order of the "Start" column. The "End" column is calculated automatically based on where the mapping fits within the list. When an item is inserted into the list, the "Name" column is automatically calculated and the value replaced.

When a Transformed Datapoint is based on a discrete datapoint, the Transformed Datapoint record editor provides controls that map the incoming raw values. Some types of discrete dimensions are complex enough to benefit from structuring the dimension members into a hierarchical structure. The discrete dimension node allows the user to define a dimension based on both a one-level and a two-level hierarchy. The hierarchy levels are defined in a simple flattened view. The user is allowed to specify the name for the hierarchy levels in the dimension. By default these are "Level #." If the datapoint record specifies that the datapoint is recorded by hashing a non-numeric value using the standard .NET framework StringEncode API, then the dimension node allows the user to specify the pre-hash value instead of the raw value. This allows the user to specify the same value that will be provided to the API. The database applies the same logic used by the API to determine the raw data value.

When a dimension is based on a bitmap datapoint, then the dimension node allows the user to "specify what the bits mean." Under the covers, the editor is actually creating a Transformed Datapoint with a simple Boolean mapping for each of the bits in the datapoint. Unlike the other dimension nodes, Bitmapped dimensions do not allow the user to delete bits.

Transformed Datapoints based on custom expression languages require not only some minor changes in the workflow, but also changes to the record editor. When building a complex, the end user needs to define (a) the contents of the Basic Description node, (b) whether the Transformed Datapoint defines a dimension, measure, or both, and (c) the expression language for the dimensions and measures. The custom expression record field allows the end user to define the custom expression. In addition, it also provides the user with the following controls: (a) help on the expression language, (b) a picker allowing the user to add a datapoint moniker, and (c) a picker allowing the user to add a mapping table moniker.

Deployment Tools

In some embodiments, a package is a set of XML files including a package manifest, configuration files, and a set of changes for the data warehouse. The package manifest describes the environment to which the data warehouse will be deployed. It also includes a list of files to be deployed and the actions to be taken for each file, information on the previous package, if that is available, and a checksum.

Each package is assigned a type. A "first"-type package is used for a first time deployment: all objects and resources will be created. A "normal" package updates a currently deployed data warehouse. A "rollback" package is used to roll back a data warehouse's configuration to a previously known good state (which is usually the last successfully deployed package).

A pipeline history database allows users to keep track of packages and of the status of deployments. Whenever a package is created, tools look for an entry in the database to see if there is a previous package, what is its status, and whether the previous package was successfully deployed. The tools then create a "delta" from the last known good configuration up to the current metadata.

A package is created based on its predecessor package and on information in the metadata database. Configuration files are first created based on whatever information is available and on the requirements and restrictions of the system. Then, based on the new files and on environmental information, the files are compared against previous versions. Changes are calculated based on the type of the package. A "normal" package updates to the current state, a "rollback" package updates to the last known good package. The changes are then captured in scripts to be executed against the processing database and the data warehouse database. Finally, a manifest is created with environment descriptions and a file list.

A data warehouse includes temporary tables, "master schema tables," and fact tables. Because the history database records what columns are in each table, the script generation engine calculates what columns should be added, what columns should be removed, and what modifications are needed to support current processing.

Once a package is created, the steps to deploy it include: (1) checking the information from the pipeline history table; (2) reading the package configuration; (3) stopping the pipeline; (4) updating the database configuration in a single distributed transaction to guarantee consistency of the data; (5) updating the configuration files for the pipeline; (6) updating the front-end reporting server; (7) restarting the pipeline so that data are processed seamlessly without loss; and (8) marking the package as successfully deployed. The metadata are updated (if necessary) to reflect the current state of the data warehouse.

Note: Tools are preferably environment agnostic. They have an internal representation of the environment allowing the configuration to be deployed in a test environment, in a pre-production environment, and in production environments while keeping track of each deployment separately.

Comparing Data Warehouse Configurations

On every deployment there is a description of the desired state of the data warehouse. This description is basically a description of each fact table (e.g., name, columns, and the column usage). This description will be used by the pipeline to process data. Each fact table is related internally to a schema which is a "blue print" of data points collected during a session. The deployment process not only updates the configuration for the fact tables but also calculates the new schema taking into account the limitations imposed by the tools used (e.g., a maximum number of columns allowed in a table for the database manager).

A fact table description file is generated from the metadata. For every approved cube, a column in the fact table is added (or preserved) if the data point(s) used on the Transformed Datapoint has gone through the approval process, and it is ready to be deployed into the production server. On the other hand, if a Transformed Datapoint is selected for removal, then it will not be part of the new fact table definition.

For each deployment package created, there is one fact tables description file. The configuration files are snapshots of the current state and are self contained. The differences between packages are incremental.

Differences are calculated between the current file and the last known deployed package. (The list of packages is preserved in the pipeline deployment history database.) In some embodiments, the steps to generate a configuration include: (1) Identify new fact tables, that is, fact table definitions not included in the previous package but present in the current one. The script creates a new table in the database. (2) Identify updated tables, that is, fact table definitions present in both files but with different column structures. (2)(a) Columns to be removed are identified. (2)(b) Columns to be added are identified. The values for the newly added columns are saved as "No Data" constants defined by the service. This allows a user to understand that the column was added after some data were collected into the system, and that the column should not be used for analysis. (2)(c) A script is generated based on the information collected in (a) and (b). This is a generic abstraction to make sure the script generation engine can be changed easily.

The script generation process can include the creation of indices and other SQL objects to improve performance.

Finally, a description is produced (e.g., an XML file), containing changes to be made to the tables in the processing and data warehouse servers. These scripts may contain keywords referring to the environments; they will be replaced with the right parameters when the package is deployed.

This way of calculating file differences allows the creation of a "rollback" package because it is always possible to go from one package to another based on the configuration information stored in the files.

An important part of this process is transaction management. The script generation engine starts a global distributed transaction as part of this process.

As part of the installation process, every step is an "install action" that can be tracked individually. Each step has a type, a name, a start time, an end time, and a status. An installation can continue after a specified action has been executed. The SQL scripts generated by the system are install actions. The install action is related to the environment and the package that was deployed. A package can be re-deployed without creating a new package in case of a hardware or configuration error. This is independent of the database transactions, because it is possible to have failures in non-transactional systems where a rollback requires some additional information.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details, such as the choices made in the SQM data warehouse, are determined by specific situations. Although the environment of the invention is described in terms of software modules or components, some processes may be equivalently performed by hardware components. Therefore, the invention as described herein contemplates all such embodiments as may come within the scope of the following claims and equivalents thereof.

We claim:

1. A method for altering a configuration of a data warehouse, the method comprising:
representing an initial configuration of the data warehouse in terms of initial configuration metadata;
presenting to a user for alteration at least a portion of the initial configuration metadata of the data warehouse;
receiving from the user an indication to alter at least a portion of the initial configuration metadata of the data warehouse;
altering at least a portion of the initial configuration metadata of the data warehouse, the altering based, at least in part, on the received user indication;
altering the configuration of the data warehouse, the altering based, at least in part, on the altered configuration metadata of the data warehouse; and
associating approval guidelines with at least a portion of the configuration metadata of the data warehouse; and
waiting until the approval guidelines are satisfied before altering the associated portion of the configuration metadata of the data warehouse;
storing the altered configuration metadata of the data warehouse in a metadata database so that the altered configuration metadata is the only configuration metadata stored in the metadata database.

2. The method of claim 1 wherein presenting to a user for alteration at least a portion of the initial configuration metadata of the data warehouse comprises presenting a cube editor for editing cube dimensions, measures, and record details.

3. The method of claim 2 wherein presenting a cube editor comprises performing an operation selected from the group consisting of: populating a list with dimensions and measures common for a namespace, presenting a control list of available dimensions grouped by feature, presenting a user-selectable checkbox for each available dimension and measure, presenting a control for adding an item to a cube definition, and presenting a control for removing an item from a cube definition.

4. The method of claim 1 wherein presenting to a user for alteration at least a portion of the initial configuration metadata of the data warehouse comprises presenting a datapoint editor for editing datapoint variables, record details, and legacy status.

5. The method of claim 1 further comprising:
associating with the user at least a portion of a configuration metadata of the data warehouse; and
notifying the user when the configuration metadata of the data warehouse associated with the user is altered.

6. The method of claim 1 further comprising:
presenting to the user a capability for searching through at least a portion of the configuration metadata of the data warehouse.

7. A computer-readable storage medium having computer-executable instructions for performing a method for altering a configuration of a data warehouse, the method comprising:
representing an initial configuration of the data warehouse in terms of initial configuration metadata;
presenting to a user for alteration at least a portion of the initial configuration metadata of the data warehouse;
receiving from the user an indication to alter at least a portion of the initial configuration metadata of the data warehouse;
altering at least a portion of the initial configuration metadata of the data warehouse, the altering based, at least in part, on the received user indication;
altering the configuration of the data warehouse, the altering based, at least in part, on the altered configuration metadata of the data warehouse; and
associating approval guidelines with at least a portion of the configuration metadata of the data warehouse; and
waiting until the approval guidelines are satisfied before altering the associated portion of the configuration metadata of the data warehouse;
storing the altered configuration metadata of the data warehouse in a metadata database so that the altered configuration metadata is the only configuration metadata stored in the metadata database.

8. The computer-readable storage medium of claim 7 further comprising computer-executable instructions for:
associating with the user at least a portion of a configuration metadata of the data warehouse; and
notifying the user when the configuration metadata of the data warehouse associated with the user is altered.

9. The computer-readable storage medium of claim 7 further comprising computer-executable instructions for:
presenting to the user a capability for searching through at least a portion of the configuration metadata of the data warehouse.

10. A system for altering a configuration of a data warehouse, the system comprising:
the data warehouse;
initial configuration metadata representing an initial configuration of the data warehouse;
a user interface for presenting to a user for alteration at least a portion of the initial configuration metadata of the data warehouse and for receiving from the user an indication to alter at least a portion of the initial configuration metadata of the data warehouse;
an altered portion of configuration metadata of the data warehouse, the altered portion based, at least in part, on the received user indication;
a configuration server for altering the configuration of the data warehouse, the altering based, at least in part, on the altered configuration metadata of the data warehouse; and
approval guidelines associated with at least a portion of the configuration metadata of the data warehouse;
a metadata database for storing the altered configuration metadata of the data warehouse so that the altered configuration metadata is the only configuration metadata stored in the metadata database.

11. The system of claim 10 further comprising:
an association between the user and at least a portion of the configuration metadata of the data warehouse; and
a notification engine for notifying the user when configuration metadata of the data warehouse associated with the user are altered.

12. The system of claim 10 further comprising:
a search engine giving the user a capability for searching through at least a portion of the configuration metadata of the data warehouse.

* * * * *